United States Patent
Nilsson

(10) Patent No.: US 7,236,540 B2
(45) Date of Patent: Jun. 26, 2007

(54) CHANNEL ESTIMATION IN A TRANSMISSION DIVERSITY SYSTEM

(75) Inventor: Johan Nilsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 808 days.

(21) Appl. No.: 10/458,128

(22) Filed: Jun. 10, 2003

(65) Prior Publication Data

US 2004/0252778 A1 Dec. 16, 2004

(51) Int. Cl.
*H04L 1/02* (2006.01)
*H04B 7/02* (2006.01)

(52) U.S. Cl. .............. 375/267; 375/347; 375/299; 455/101; 455/69

(58) Field of Classification Search .......... 375/299, 375/347, 267; 455/101, 69, 562.1, 272
See application file for complete search history.

(56) References Cited

U.S. PATENT DOCUMENTS

| | | | | |
|---|---|---|---|---|
| 6,754,286 B2 * | 6/2004 | Hottinen et al. | ............ | 375/299 |
| 6,892,059 B1 * | 5/2005 | Kim et al. | ................. | 455/272 |
| 7,010,055 B2 * | 3/2006 | Harrison et al. | ............ | 375/267 |
| 7,099,634 B2 * | 8/2006 | Tanaka | ..................... | 455/101 |
| 2002/0186785 A1 * | 12/2002 | Hoshino et al. | ............ | 375/299 |
| 2003/0148738 A1 | 8/2003 | Das et al. | | |

FOREIGN PATENT DOCUMENTS

| | | |
|---|---|---|
| EP | 1 133 072 A1 | 9/2001 |
| EP | 1 191 755 A2 | 3/2002 |
| WO | WO 03/047192 A1 | 6/2003 |
| WO | WO-03/098823 | 11/2003 |

OTHER PUBLICATIONS

Universal Mobile Telecommunications System (UMTS); Physical Layer Procedures (FDD) (3GPP TS 25.214 version 3.4.0 Release 1999); XP-002166612; ETSI TS 125 124 V3.4.0 (Sep. 2000); pp. 1-47.
Standard Search Report for RS 110099 US completed Feb. 11, 2004.
"Closed loop mode transmit diversity"; 3GPP TS 25.214 V5.8.0 (Mar. 2004); pp. 44-60.
3rd Generation Partnership Project; Technical Specification Group Radio Access Networks; UE Radio Transmission and Reception (FDD) (Release 4); 3GPP TS 25.101; V4.2.0 (Sep. 2001); pp. 1-69.
3rd Generation Partnership Project; Technical Specification Group Radio Access Network; Physical Layer Procedures (FDD) (Release 4); 3GPP TS 25.214; V4.2.0 (Sep. 2001); pp. 1-51.
Third-Generation Radio Access Standards by Mats Nilsson; Ericsson Review No. 3, 1999; pp. 110-121.
WCDMA Evaluation System—Evaluating the Radio Access Technology of Third-Generation Systems by Jan Eldståhl and Anders Näsman; Ericsson Review No. 2, 1999; pp. 56-69.

* cited by examiner

*Primary Examiner*—Phuong Phu
(74) *Attorney, Agent, or Firm*—Michael Cameron, Esq.

(57) ABSTRACT

A method of channel estimation in a transmission diversity system includes observing phase differences between channel estimates in a diversity antenna, either determining whether a phase shift is a right half plane or a left half plane and calculating a left/right estimate, or determining whether a phase shift is in a lower half plane or an upper half plane and calculating an up/down estimate, and performing an estimate of the transmitted phase using the sum over at least two slots of one left/right estimate or one up/down estimate.

20 Claims, 3 Drawing Sheets

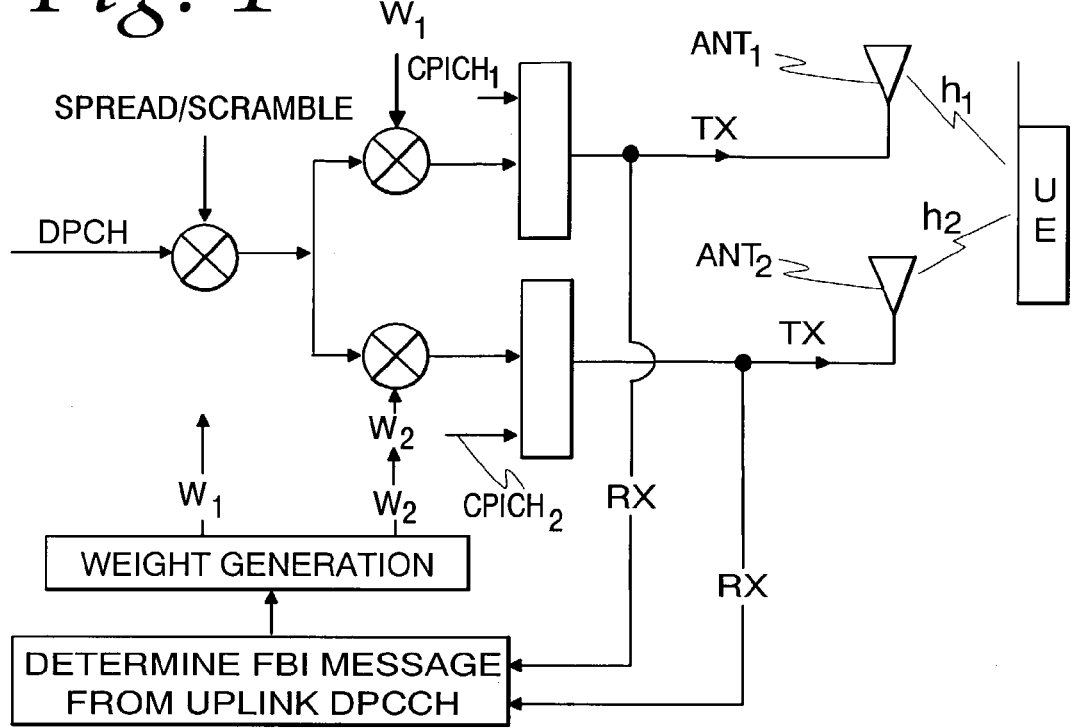
*Fig. 1*
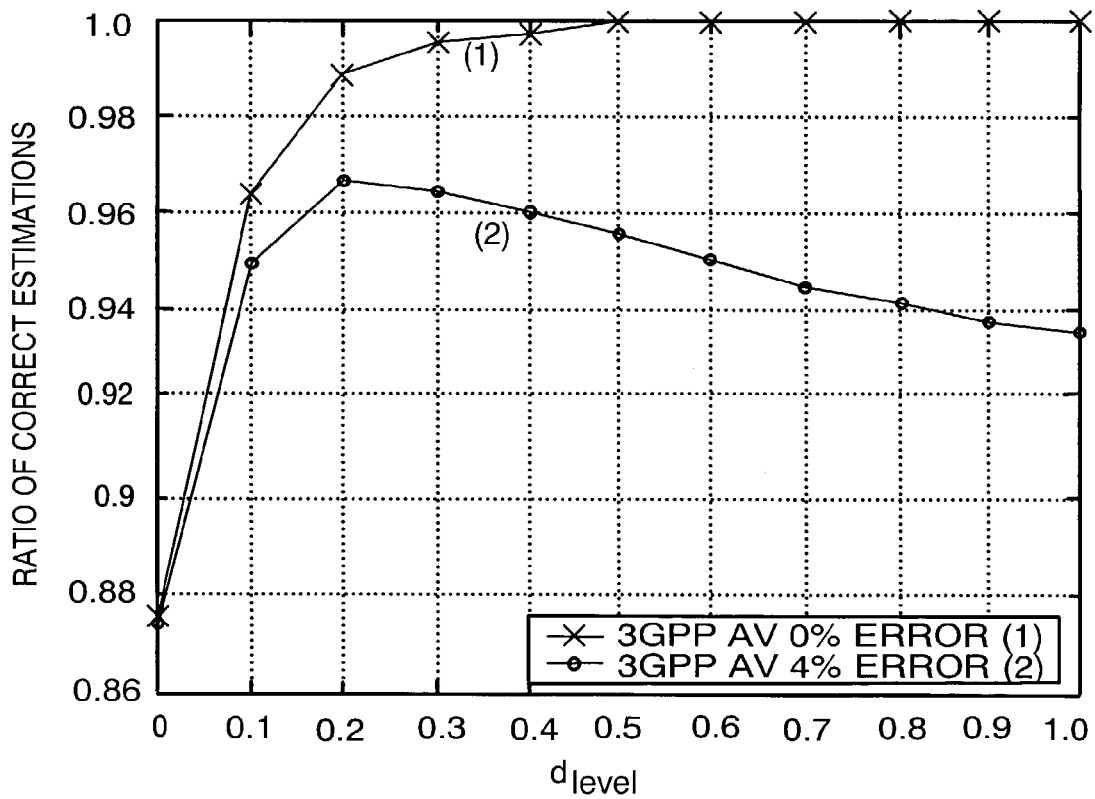
*Fig. 2* ESTIMATION OF BS STATE, TX-DIV CL M 1, CASE 1, DPCH SNR = −24

US 7,236,540 B2

CHANNEL ESTIMATION IN A TRANSMISSION DIVERSITY SYSTEM

BACKGROUND OF THE INVENTION

1. Field of the Invention

The present invention relates generally to channel estimation in a transmission diversity system and, more particularly, to a method for channel estimation/antenna verification in WCDMA (wideband code division multiple access) closed loop mode 1 transmission diversity.

2. History of Related Art

To be able to use channel estimates from the usually strong common pilot channel (CPICH), the phase difference between CPICH and the dedicated physical channel (DPCH) on the diversity antenna needs to be estimated. This is, in the Third Generation Partnership Project (3GPP) documents, referred to as antenna verification. Some methods for antenna verification are shown in the 3GPP documents [1] $3^{rd}$ Generation Partnership Project (3GPP), 3G TS 25.101 V3.4.0, October 2000 and [2] $3^{rd}$ Generation Partnership Project (3GPP), 3G TS 25.214 V3.4.0, September 2000. If DPCH is used for channel estimation, the implementation margin is only 1.2 dB.

In WCDMA base station transmission diversity can be used. Four methods for operation are specified by 3GPP:
1. No TX-diversity
2. Open loop TX-diversity
3. Closed loop TX-diversity mode 1
4. Closed loop TX-diversity mode 2

In Closed loop mode 1, different antenna 2 settings are used for CPICH and DPCH. This means that the channel estimates from CPICH cannot directly be used for DPCH. An advantage of using channel estimates from CPICH is that the channel estimates from CPICH usually are less noisy than channel estimates from DPCH, due to the high transmission power for CPICH. The fact that the DPCH does not have the same transmission conditions as the CPICH makes it impossible to directly use the CPICH for channel estimation. The estimation of the applied phase shift is also known as antenna verification.

Antenna settings for CPICH and DPCH can only differ in known ways. Depending on feedback information (FBI) commands sent from a user equipment (UE) to a base station (BS), an extra phase advance $\phi \in \{\pi/4, 3\pi/4, 5\pi/4, 7\pi/4\}$ is added to antenna 2. Using information about the channel estimates for antenna 2 and the generated FBI commands, the phase advance $\phi$ can be estimated. In closed loop mode 1, the user equipment (UE) instructs the base station (BS) how to apply a phase shift for the dedicated physical channel (DPCH) on antenna 2 (i.e., the diversity antenna) with FBI commands on the uplink. This phase shift is one of $\{\pi/4, 3\pi/4, 5\pi/4, 7\pi/4\}$. The phase shift makes the common pilot channel (CPICH) and DPCH have different channel coefficients for antenna 2.

If there were no transmission errors on the feedback information (FBI) commands on the uplink, the UE would directly know the phase shift that is applied by the base station. In the presence of errors on the FBI commands the UE can, however, improve the situation by observing the phase difference on second (diversity) antenna channel estimates from CPICH and DPCH.

One method for antenna verification is described in Annex A of [2] $3^{rd}$ Generation Partnership Project (3GPP), 3G TS 25.214 V3.4.0, September 2000 (hereinafter [2]). In this method, a certain inequality is checked after each slot. When the UE determines if a phase shift in the right or left half plane is used, the following inequality is checked.

$$2 \sum_{i=1}^{n_{fingers}} \frac{\sqrt{2}}{\sigma_i^2} \Re\left(\gamma \hat{h}_{2,i}^D \hat{h}_{2,i}^{C*}\right) > \ln\left(\frac{Prob(\pi/2 \leq \phi < 3\pi/2)}{Prob(-\pi/2 \leq \phi < \pi/2)}\right)$$

where $n_{fingers}$ is the number of fingers used in the RAKE combiner, $\sigma_i^2$ is the variance of the Gauss process, $\hat{h}_{2,i}^D$ is the channel estimate for the second antenna, ith RAKE finger and DPCH, and $\hat{h}_{2,i}^{C*}$ is the complex conjugate of the channel estimate for the second antenna, ith RAKE finger and CPICH.

If the inequality holds, it is estimated that $-\pi/2 \leq \phi < \pi/2$. In the above inequality, $\gamma^2$ is the DPCH signal-to-noise ratio (SNR)/CPICH SNR. The multiplication with $\gamma$ will scale the above to an SNR-like expression for DPCH. The probabilities are evaluated depending on sent FBI commands. If upper or lower half plane is being decided, the following inequality is checked:

$$-2 \sum_{i=1}^{n_{fingers}} \frac{\sqrt{2}}{\sigma_i^2} \Im\left(\gamma \hat{h}_{2,i}^D \hat{h}_{2,i}^{C*}\right) > \ln\left(\frac{Prob(\pi \leq \phi < 2\pi)}{Prob(0 \leq \phi < \pi)}\right)$$

If the inequality holds, it is estimated that $\pi \leq \phi < 2\pi$.

SUMMARY OF THE INVENTION

A method of channel estimation in a transmission diversity system includes observing phase differences between channel estimates in a diversity antenna and determining whether a phase shift is in a right-half plane or a left-half plane. The method also includes calculating a left/right estimate. The step of calculating the left/right estimate includes comparing a value based on the channel estimates to a threshold based on a previous left/right command. The method also includes determining whether the phase shift is in a lower-half plane or an upper-half plane and calculating an up/down estimate. The step of calculating the up/down estimate includes comparing a value based on the channel estimates to a threshold based on a previous up/down command. The method also includes estimating the transmitted phase using results of the steps of calculating the left/right estimate and the up/down estimate. The method also includes updating a previous left/right estimate or a previous up/down estimate using channel estimates for a current slot and a corresponding previous slot. The step of updating a previous left/right estimate or a previous up/down estimate can include comparing a value based on the channel estimates for the previous slot and the corresponding current slot to a threshold based on a previous left/right command or a previous up/down command.

An apparatus for transmission-diversity channel estimation includes means for observing phase differences between channel estimates in a diversity antenna and means for determining whether a phase shift is in a right-half plane or a left-half plane. The apparatus also includes means for calculating a left/right estimate. Calculation of the left/right estimate includes comparing a value based on the channel estimates to a threshold based on a previous left/right command. The apparatus also includes means for determining whether the phase shift is in a lower-half plane or an upper-half plane and means for calculating an up/down estimate. Calculation of the up/down estimate includes comparing a value based on the channel estimates to a threshold based on a previous up/down command. The apparatus also includes means for estimating the transmitted phase using results of the steps of calculating the left/right estimate and the up/down estimate. The apparatus also includes means for updating a previous left/right estimate or a previous up/down estimate using channel estimates for a current slot and a corresponding previous slot.

An article of manufacture for channel estimation in a transmission diversity system includes at least one computer readable medium. Processor instructions on the at least one computer readable medium are configured to be readable from the at least one computer readable medium by at least one processor. The processor instructions cause the at least one processor to operate as to observe phase differences between channel estimates in a diversity antenna, determine whether a phase shift is in a right-half plane or a left-half plane, and calculate a left/right estimate. The calculation of the left/right estimate includes a comparison of a value based on the channel estimates to a threshold based on a previous left/right command. The processor instructions cause the at least one processor to determine, based on information in an odd-numbered slot, whether the phase shift is in a lower-half plane or an upper-half plane and calculate an up/down estimate. The calculation of the up/down estimate includes comparing a value based on the channel estimates to a threshold based on a previous up/down command. The processor instructions also cause the at least one processor to estimate the transmitted phase using results of the calculations of the left/right estimate and the up/down estimate. The processor instructions also cause the at least one processor to operate as to update a previous left/right estimate or a previous up/down estimate using channel estimates for a current slot and a corresponding previous slot.

BRIEF DESCRIPTION OF THE DRAWINGS

In the drawings:

FIG. 1 is a functional block diagram showing a closed loop transmission diversity between a base station and a user equipment (UE);

FIG. 2 shows in a graphic form the ratio of correctly estimated base station states plotted versus the decision level, $d_{level}$;

DETAILED DESCRIPTION OF EXEMPLARY EMBODIMENTS OF THE INVENTION

Figure 3:
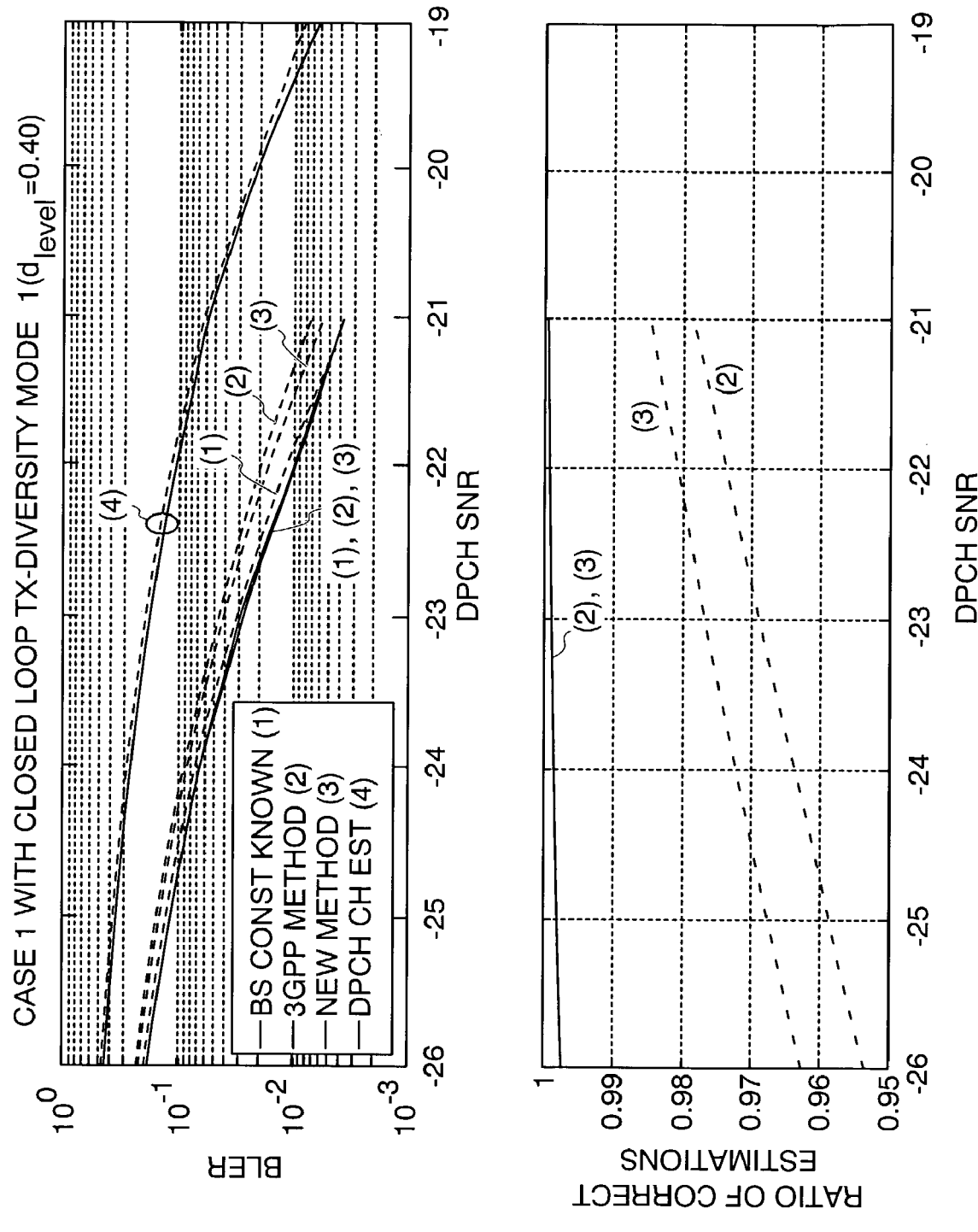
FIG. 3 plots the performance of several methods of channel estimation and corresponding ratios.

A basic structure for closed loop transmission diversity is shown in FIG. 1. By feedback commands, the UE instructs the base station how to set weights $w_1$ and $w_2$. The feedback commands are sent in an FBI field of the uplink DPCH slot structure. The feedback command is one bit of information for each slot. The UE determines the optimal weights to maximize power P:

$$P = \underline{w}^H H^H H \underline{w},$$

where $$H = (\underline{h}_1 \ \underline{h}_2)$$

$$\underline{w} = \begin{pmatrix} w_1 \\ w_2 \end{pmatrix}$$

and $\underline{h}_i$ represents estimated channel responses for antenna 1 and 2. The base station is shown in communication with a user equipment (UE). In closed loop mode 1, the antenna weights are:

$$w_1 = 1$$

$$w_2 = e^{j\phi}, \phi \in \{\pi/4, 3\pi/4, 5\pi/4, 7\pi/4\}$$

After reception of each slot, the UE determines the optimal phase adjustment $\phi$ for antenna 2 (see $3^{rd}$ Generation Partnership Project (3GPP), 3G TS 25.214, Section 7.2). If the slot number is even, the UE signals if the optimal phase adjustment is in the right or left half plane (i.e. $-\pi/2 \leq \phi < \pi/2$, or $\pi/2 \leq \phi < 3\pi/2$), and if the slot number is odd, the UE signals if the optimal phase adjustment is in the upper or lower half plane (i.e., $0 \leq \phi < \pi$ or $\pi \leq \phi < 2\pi$).

In the base station, the FBI commands from the two latest slots are used to set the weight $w_2$. This means that the base station will filter the received FBI commands to set the weight $w_2$ with the phase $\phi \in \{\pi/4, 3\pi/4, 5\pi/4, 7\pi/4\}$. As a frame contains an odd number of slots (15), the end of the frame is treated in a special way. After slot 14 comes slot 0. Both of these slots will signal if the optimal phase adjustment is in the right or left half plane. The standard document [2] prescribes that slot 0 should be combined with slot 13, just as was done with slot 14. (This property of the standard comes from the change of number of slots in a frame from 16 to 15.)

As the FBI commands are sent over the uplink, there is a risk that the command is received erroneously. The error probability is typically in the order of 0-10%. In this description, an exemplary 4% error rate is used, just as in the appendix of [2]. The feedback errors make the used $w_2$ unknown to the UE, which makes it difficult to use the CPICH for channel estimation. In an effort to overcome this uncertainty, antenna verification can be used.

In the Annex A of [2], one method for antenna verification is described. As stated above, when the UE determines if a phase shift in the right or left half plane is used, the following inequality is checked:

$$2 \sum_{i=1}^{n_{fingers}} \frac{\sqrt{2}}{\sigma_i^2} \Re\left(\gamma \hat{h}_{2,i}^D \hat{h}_{2,i}^{C*}\right) > \ln\left(\frac{Prob(\pi/2 \leq \phi < 3\pi/2)}{Prob(-\pi/2 \leq \phi < \pi/2)}\right)$$

If the inequality holds, it is estimated that $-\pi/2 \leq \phi < \pi/2$. The probabilities are evaluated depending on sent FBI commands.

If upper or lower half plane is being decided, the following inequality is checked:

$$-2 \sum_{i=1}^{n_{fingers}} \frac{\sqrt{2}}{\sigma_i^2} \Im\left(\gamma \hat{h}_{2,i}^D \hat{h}_{2,i}^{C*}\right) > \ln\left(\frac{Prob(\pi \leq \phi < 2\pi)}{Prob(0 \leq \phi < \pi)}\right)$$

If the inequality holds, it is estimated that $\pi \leq \phi < 2\pi$.

The estimate of the transmitted phase is then formed using the last two slots, which will be one up/down-estimate, and one left/right-estimate. The estimated phase is then used to compensate the CPICH channel estimates to be usable for maximum ratio combining.

There are several methods to do channel estimation in CPICH and DPCH. In this description, primary channel estimates are used for both CPICH and DPCH. As both CPICH and DPCH have orthogonal pilot patterns on the two antennas, channel estimates can be made for both antenna 1 and 2. (This is not the case in mode 2, where only the sum-channel can be estimated for DPCH.)

There are no derivations of the antenna verification method in [2]. An SNR is formed, which is compared to a decision level that depends on both the sent FBI command and the feedback error probability.

Optimization of Decision Level

In an embodiment of the present invention, a modification to the antenna verification used in [2] is made as follows:

For left/right estimate, the following inequality is checked:

$$\sum_{i=1}^{n_{fingers}} \frac{1}{\sigma_i^2} \Re(\gamma \hat{h}_{2,i}^D \hat{h}_{2,i}^{C*}) > \text{"last left/right FBI command"} \cdot d_{level}$$

If the inequality holds, it is estimated that $-\pi/2 \leq \phi < \pi/2$. The FBI commands may be coded such that left corresponds to +1 and right corresponds to −1.

For up/down estimate, the following inequality is checked:

$$\sum_{i=1}^{n_{fingers}} \frac{1}{\sigma_i^2} \Im(\gamma \hat{h}_{2,i}^D \hat{h}_{2,i}^{C*}) > \text{"last up/down FBI command"} \cdot d_{level}$$

If the inequality holds, it is estimated that $0 \leq \phi < \pi$. The FBI commands may be coded such that down corresponds to +1 and up corresponds to −1.

In a case with Gaussian white noise, the scalings and optimal decision level would be as in the previous discussion. However, in a case with a multi-path fading channel, as the test case, the optimal decision level is not known. In the following, a suitable value for $d_{level}$ is determined by simulating the case that has performance requirements in the 3GPP standard, see [1]. It should be understood that the determined value of $d_{level}$ is intended to be exemplary only and that $d_{level}$ can be chosen differently depending on the conditions.

FIG. 2 is a graph of the ratio of correctly-estimated base station states as a function of $d_{level}$. In FIG. 2, the ratios of correctly-estimated base station states are plotted versus $d_{level}$. As can be seen, the performance behaves a bit differently depending on the probability for transmission error of the feedback commands. When there are no feedback errors it is, of course, optimal to rely on the feedback commands. However, when there are feedback errors, a tradeoff between relying on the sent FBI commands or on the observed phase difference is optimal. As a reasonable tradeoff between the two cases, $d_{level}=0.4$ could be chosen. For block error ratio (BLER) performance of the method, see Simulation Results, below.

In FIG. 2, optimization of $d_{level}$ is shown. The ratios of correct estimations are shown for the cases with 0% and 4% error rate on FBI commands. When $d_{level}=0$ the information on sent FBI commands is not used; thus, the two cases have the same performance. For high values of $d_{level}$, the FBI commands are very much trusted. This gives 100% correct estimations when there are no transmission errors and $(1-0.04)^2=92.2\%$ when there are 4% transmission errors. The square operation comes from the fact that two consecutive half plane estimates need to be correct for a correct estimation.

Extension to Improve SNR

In the antenna verification method in [1], only the result of one FBI command is considered after every slot. However, an FBI command is used for two slots. Thus, even if the main purpose of antenna verification for a slot is to decide which command was received by the base station for the current slot, the current channel estimates also contain additional information on the decision that was made the previous slot.

An enhanced method can be formed by adding the new information to the "SNR" that was built up after the last slot and then reconsidering the decision. In the "Simulation Results" below, it is seen that this increases the ratio of correct estimations further.

In an embodiment of the invention, the inequalities to check when the update is done are as follows: (special handling is needed in the end of a frame).

For an update of a left/right estimate, that is, when the last FBI command was an up/down command, the following inequality is checked:

$$\sum_{slot=1}^{2} \sum_{i=1}^{n_{fingers}} \frac{1}{\sigma_i^2} \Re(\gamma \hat{h}_{2,i}^D \hat{h}_{2,i}^{C*}) > \text{"last left/right FBI command"} \cdot d_{level}$$

If the inequality holds, it is estimated that $-\pi/2 \leq \phi < \pi/2$. The FBI commands are coded such that left corresponds to +1, and right corresponds to −1.

In the same way, for update of an up/down estimate, the following inequality is checked:

$$\sum_{slot=1}^{2} \sum_{i=1}^{n_{fingers}} \frac{1}{\sigma_i^2} \Im(\gamma \hat{h}_{2,i}^D \hat{h}_{2,i}^{C*}) > \text{"last up/down FBI command"} \cdot d_{level}$$

If the inequality holds, it is estimated that $0 \leq \phi < \pi$. The FBI commands are coded such that down corresponds to +1 and up corresponds to −1.

The same $d_{level}$ as before has been used in the simulations. A new $d_{level}$ can, however, be optimized as was done for the previous method. This will also permit a different $d_{level}$ for the first estimate of a command and when an estimate of a command is updated.

This extension of the invention utilizes the sum over two slots. This sum is made to improve the SNR and hence decrease the error probability. The performance is improved with 0.2 dB in the test case.

Either an up/down or a left/right estimate is typically done in each slot (based on the equations described in the Background of the Invention section, which are optimal for channels with white Gaussian noise, or the more general equations described by this invention).

In the extension, the following are performed in each slot:
either an up/down or left/right estimate is done as above (i.e. based on the current slot only), and then
the opposite estimate, either a left/right or an up/down, is done based on the current and previous slot, and this estimate updates the estimate done in the previous slot.

Simulation Results

The performance of the following methods were compared by simulations:
True channel knowledge. (Both channels and phases known)
Antenna verification as done in 3GPP specification [2].
New method proposed above.
Channel estimates from DPCH. (No interpolation, interpolation can only be used for antenna 1)

FIG. 3 is a plot of performance of several channel-estimation methods and corresponding ratios. In FIG. 3 the performance of the above methods is shown. It is seen that much is gained by using the CPICH for channel estimation. The performance difference in block error ratio (BLER) between the 3GPP method, and the new extended method is around 0.2 dB. However, in the ratio of correctly estimated phase rotations the difference is larger. In Table 1 the implementation margin compared to the standardization point is shown.

In FIG. 3, solid lines are without transmission errors for FBI commands and dashed lines are with 4% transmission errors. The specification point in [1] is that there should be better performance than BLER=$10^{-2}$ for DPCH $_{SNR}$=−18.0 dB and error rate 4%. All methods using antenna verification leave an implementation margin of more than 3 dB.

The complexity of the new method is double that of 3GPP antenna verification. However, both are still of quite low complexity.

TABLE 1

Implementation margin for the simulated methods.

| Method | Implementation margin [dB] |
|---|---|
| DPCH | 1.2 |
| 3GGP AV + CPICH | 3.4 |
| New Method + CPICH | 3.6 |

Figure 4:
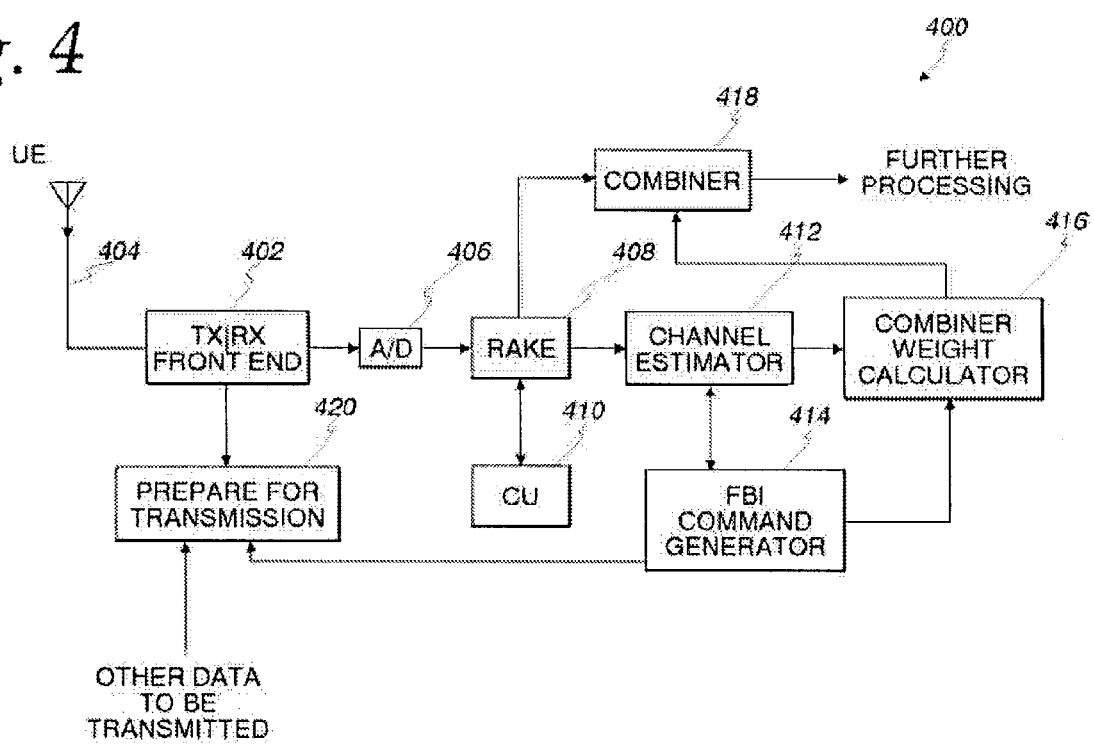
FIG. 4 is a block diagram of the user equipment (UE) of FIG. 1 in accordance with principles of the present invention.

FIG. 4 is a block diagram of the user equipment (UE) of FIG. 1 in accordance with principles of the present invention. A UE 400 is shown in FIG. 4. The UE 400 could be, for example, a mobile station operable in accordance with WCDMA. The UE 400 includes a transmit/receive (TX/RX) front end 402 and an antenna 404 interoperably connected to the TX/RX front end 402 and adapted to communicate with, for example, the base station shown in FIG. 1. The UE 400 also includes an analog-to-digital (A/D) converter 406 that receives an output from the TX/RX front end and provides a digital output to a RAKE combiner 408. The RAKE combiner 408 communicates with a control unit (CU) 410. The CU 410 supports the RAKE combiner 408 by performing functions such as, for example, delay estimation and choice of delay for each RAKE finger.

A channel estimator 412 receives an output from the RAKE combiner 408. The channel estimator 412 calculates four ĥ values for each finger of the RAKE combiner 408, possibly together with other channel parameter estimates. An FBI command generator 414 receives an output of the channel estimator 412. The FBI command generator generates a command that is transmitted to, for example, the base station shown FIG. 1. The command generated by the FBI command generator 414 is aimed at making signals from the two antennas (i.e., $ANT_1$ and $ANT_2$) combine constructively in the UE 400.

A prepare-for-transmission block 420 receives as inputs an output of the FBI command generator 414 as well as other data to be transmitted. The prepare-for-transmission block 420 provides an output to the TX/RX front end 402.

A combiner weight calculator 416 receives outputs of the channel estimator 412 and the FBI command generator 414. The combiner weight calculator 416 calculates $\hat{h}_{comb} = \hat{h}_{C1,i} + e^{j\hat{\phi}} \hat{h}^C_{2,i}$, where $\hat{\phi}$ is estimated as described above which is output to a combiner 418. $\hat{h}_{comb}$ is calculated from the channel estimates and from the FBI command output by the FBI command generator 414. An output of the combiner 414 can undergo further processing as needed. The combiner weight calculator 416 may consider either information from the current slot only or from both the current slot and a previous slot as described above.

Embodiments of the present invention may be implemented in, for example, integrated circuits or chip sets, hardware (e.g., ASIC), software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory). Principles of the invention may also be applied in implementations in integrated circuits, field Programmable gate arrays (FGAs), chip sets, or ASICs.

CONCLUSIONS

An improvement in channel estimation for the closed loop mode 1 transmission diversity is achievable in accordance with the present invention. To be able to use channel estimates from the usually strong CPICH, the phase difference between the diversity channels for CPICH and DPCH needs to be estimated. This phase difference estimation is, in the 3GPP documents [1] and [2], referred to as antenna verification. By simulations, it has been shown that the exemplary method from the 3GPP documents gives adequate performance. However, an improved method in accordance with the present invention further improves performance. The improvement compared to using channel estimates from DPCH is great (2.4 dB). If DPCH is used for channel estimation, the implementation margin is only 1.2 dB.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of channel estimation in a transmission diversity system, comprising:
   observing phase differences between channel estimates in the transmission diversity system by performing the sub-steps of;
      determining whether a phase shift is in a right-half plane or a left-half plane and then calculating a left/right estimate, wherein the step of calculating the left/right estimate comprises comparing a value based on the channel estimates to a threshold based on a previous left/right command; and
      determining whether the phase shift is in a lower-half plane or an upper-half plane and then calculating an up/down estimate, wherein the step of calculating the up/down estimate comprises comparing a value based on the channel estimates to a threshold based on a previous up/down command;
   estimating the transmitted phase using results of the sub-steps of calculating the left/right estimate and the up/down estimate; and
   updating a previous left/right estimate or a previous up/down estimate using channel estimates for a current slot and a corresponding previous slot.

2. The method of claim 1, wherein:
   the step of determining whether the phase shift is in a right-half plane or a left-half plane is based on information in an even-numbered slot; and
   the step of determining whether the phase shift is in a lower-half plane or an upper-half plane is based on information in an odd-numbered slot.

3. The method of claim 1, wherein:
   the step of determining whether the phase shift is in a right-half plane or a left-half plane is based on information in an odd-numbered slot; and
   the step of determining whether the phase shift is in a lower-half plane or an upper-half plane is based on information in an even-numbered slot.

4. The method of claim 1, wherein the step of updating a previous left/right estimate or a previous up/down estimate comprises comparing a value based on the channel estimates for the previous slot and the corresponding current slot to a threshold based on a previous left/right command or a previous up/down command.

5. The method of claim 4, wherein: the value based on the channel estimates for the previous and current slots are:

$$\sum_{i=1}^{n_{fingers}} \frac{1}{\sigma_i^2} \Re\left(\gamma \hat{h}_{2,i}^D \hat{h}_{2,i}^{C*}\right) \text{ and } \sum_{slot=1}^{2} \sum_{i=1}^{n_{fingers}} \frac{1}{\sigma_i^2} \Re\left(\gamma \hat{h}_{2,i}^D \hat{h}_{2,i}^{C*}\right),$$

respectively, for the threshold based on the previous left/right command; and $$\sum_{i=1}^{n_{fingers}} \frac{1}{\sigma_i^2} \Im\left(\gamma \hat{h}_{2,i}^D \hat{h}_{2,i}^{C*}\right) \text{ and } \sum_{slot=1}^{2} \sum_{i=1}^{n_{fingers}} \frac{1}{\sigma_i^2} \Im\left(\gamma \hat{h}_{2,i}^D \hat{h}_{2,i}^{C*}\right),$$

respectively, for the threshold based on the previous up/down command; wherein $\Re$ is the real part;
$\gamma$ is the DPCH SIR/CPICH SNR
$\sigma_i^2$ is the variance of the Gauss process:
$\Im$ is the imaginary part;
$\hat{h}_{2,i}^D$ is a channel estimate from a first logical channel of the transmission diversity system; and
$\hat{h}_{2,i}^{C*}$ is a channel estimate from a second logical channel of the transmission diversity system.

6. The method of claim 1, wherein: the threshold is (last right/left FBI command) $d_{level}$ for updating of a left/right estimate; and
   the threshold is (last up/down FBI command) $d_{level}$ for updating of an up/down estimate.

7. The method of claim 1, wherein the observing step is performed in a closed loop mode 1 transmission diversity system.

8. The method of claim 7, wherein the transmission diversity system is a CDMA system.

9. The method of claim 1, further comprising using the result of the estimating step to compensate CPICH channel estimates.

10. The method of claim 1, wherein the channel estimates comprise channel estimates in CPICH and DPCH.

11. An apparatus for transmission-diversity channel estimation, the apparatus comprising:
    means for observing phase differences between channel estimates in a transmission diversity system said observing means further comprising
       means for determining whether a phase shift is in a right-half plane or a left-half plane and means for calculating a left/right estimate, wherein calculation of the left/right estimate comprises comparing a value based on the channel estimates to a threshold based on a previous left/right command; and
       means for determining whether the phase shift is in a lower-half plane or an upper-half plane and means for calculating an up/down estimate, wherein the calculation of the up/down estimate comprises comparing a value based on the channel estimates to a threshold based on a previous up/down command;
    means for estimating the transmitted phase using results of the means for calculating the left/right estimate and the up/down estimate; and
    means for updating a previous left/right estimate or a previous up/down estimate using channel estimates for a current slot and a corresponding previous slot.

12. The apparatus of claim 11, wherein the means for updating a previous left/right estimate or a previous up/down estimate comprises means for comparing a value based on the channel estimates for the previous slot and the corresponding current slot to a threshold based on a previous left/right command or a previous up/down command.

13. The apparatus of claim 12, wherein:
    the value based on the channel estimates for the previous and current slots are:

$$\sum_{i=1}^{n_{fingers}} \frac{1}{\sigma_i^2} \Re\left(\gamma \hat{h}_{2,i}^D \hat{h}_{2,i}^{C*}\right) \text{ and } \sum_{slot=1}^{2} \sum_{i=1}^{n_{fingers}} \frac{1}{\sigma_i^2} \Re\left(\gamma \hat{h}_{2,i}^D \hat{h}_{2,i}^{C*}\right),$$

respectively, for the threshold based on the previous left/right command; and $$\sum_{i=1}^{n_{fingers}} \frac{1}{\sigma_i^2} \Im(\gamma \hat{h}_{2,i}^D \hat{h}_{2,i}^{C*}) \text{ and } \sum_{slot=1}^{2} \sum_{i=1}^{n_{fingers}} \frac{1}{\sigma_i^2} \Im(\gamma \hat{h}_{2,i}^D \hat{h}_{2,i}^{C*}),$$

respectively, for the threshold based on the previous up/down command; wherein

ℜ is the real part;
γ is the DPCH SIR/CPICH SNR
$\sigma_i^2$ is the variance of the Gauss process:
ℑ is the imaginary part;
$\hat{h}_{2,i}^D$ is a channel estimate from a first logical channel of the transmission diversity system; and
$\hat{h}_{2,i}^{C*}$ is a channel estimate from a second logical channel of the transmission diversity system.

14. The apparatus of claim 11, wherein: the threshold is (last right/left FBI command) $d_{level}$ for updating of a left/right estimate; and
the threshold is (last up/down FBI command) $d_{level}$ for updating of an up/down estimate.

15. The apparatus of claim 11, wherein the means for observing is part of a closed loop mode 1 transmission diversity system.

16. The apparatus of claim 15, wherein the transmission diversity system is a CDMA system.

17. The apparatus of claim 11, further comprising means for using the result of the estimation by the means for estimating to compensate CPICH channel estimates.

18. The apparatus of claim 11, wherein the channel estimates comprise channel estimates in CPICH and DPCH.

19. The apparatus of claim 11, wherein the apparatus comprises a user equipment operable according to wideband code-division multiple access (WCDMA).

20. An article of manufacture for channel estimation in a transmission diversity system, the article of manufacture comprising:
at least one computer readable medium; and
processor instructions contained on the at least one computer readable medium, the processor instructions configured to be readable from the at least one computer readable medium by at least one processor and thereby cause the at least one processor to operate as to:
observe phase differences between channel estimates in the transmission diversity system by:
determining whether a phase shift is in a right-half plane or a left-half plane and calculating a left/right estimate, wherein the calculation of the left/right estimate comprises a comparison of a value based on the channel estimates to a threshold based on a previous left/right command; and
determining whether the phase shift is in a lower-half plane or an upper-half plane and calculating an up/down estimate, wherein the calculation of the up/down estimate comprises comparing a value based on the channel estimates to a threshold based on a previous up/down command;
estimate the transmitted phase using results of the calculations of the left/right estimate and the up/down estimate; and
operate as to update a previous left/right estimate or a previous up/down estimate using channel estimates for a current slot and a corresponding previous slot.

* * * * *